(12) United States Patent
Liu et al.

(10) Patent No.: US 12,536,113 B2
(45) Date of Patent: Jan. 27, 2026

(54) PAGE STATUS MANAGEMENT METHOD AND RELATED DEVICE

(71) Applicant: Huawei Technologies Co., Ltd., Shenzhen (CN)

(72) Inventors: Zhenjun Liu, Shenzhen (CN); Chuanzeng Liang, Shenzhen (CN); Erqing Qian, Xi'an (CN); Biwei He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/889,766

(22) Filed: Sep. 19, 2024

(65) Prior Publication Data

US 2025/0094366 A1   Mar. 20, 2025

(30) Foreign Application Priority Data

Sep. 20, 2023   (CN) .......................... 202311220929.0

(51) Int. Cl.
*G06F 13/16*      (2006.01)
*G06F 11/30*      (2006.01)

(52) U.S. Cl.
CPC ...... *G06F 13/1689* (2013.01); *G06F 11/3075* (2013.01)

(58) Field of Classification Search
CPC .......................... G06F 13/1689; G06F 11/3075
See application file for complete search history.

(56) References Cited

U.S. PATENT DOCUMENTS

2003/0126354 A1    7/2003   Kahn et al.

*Primary Examiner* — Eric Cardwell
(74) *Attorney, Agent, or Firm* — Conley Rose, P.C.

(57) ABSTRACT

A page status management method includes collecting statistics on N first memory access commands received in a first time window; determining reception interval information of the N first memory access commands, where the reception interval information indicates denseness of a stream of commands in the first time window; determining active standby time based on the reception interval information; and after a second memory access command accesses a target memory page, if no other memory access command accesses the target memory page within the active standby time, closing the target memory page, where the second memory access command is any memory access command received in a second time window, and the second time window is a time window after the first time window.

20 Claims, 14 Drawing Sheets

PAGE STATUS MANAGEMENT METHOD AND RELATED DEVICE

CROSS-REFERENCE TO RELATED APPLICATION

This application claims priority to Chinese Patent Application No. 202311220929.0 filed on Sep. 20, 2023, which is hereby incorporated by reference in its entirety.

TECHNICAL FIELD

This application relates to the field of electronic technologies, and in particular, to a page status management method and a related device.

BACKGROUND

With development of the mobile Internet, various electronic products including mobile phones, tablet computers, smartwatches, and the like are widely applied, and interaction with various electronic products becomes an indispensable and important part of people's daily work and entertainment. To meet people's increasingly complex requirements, increasingly abundant application programs can be run on the electronic product. Accordingly, people pose an increasingly high requirement on battery life of the electronic products. Due to limitations of a device size and a battery capacity, the electronic products are expected to have lower power consumption. In addition, for plug-in battery-free products, although they are free from shortage of battery life or power off, the plug-in battery-free products are mainly optimized in reduction of power consumption driven by the plan of energy conservation and emission reduction, the "dual carbon" target, the goal of reduction of power-consumption costs for operation and maintenance, and other factors.

There are two components with high power consumption in electronic products such as a processor, for example, a central processing unit (CPU) or a system on chip (SOC); and a main memory, for example, a dynamic random-access memory (RAM) (DRAM). According to industry test data of handheld terminals, it can be learned that DRAM's power consumption is over 15% of SoC's power consumption. Table 1 shows data of DRAM's power consumption and SoC's power consumption in a daily of use (DOU) scenario of daily used applications (APPs).

TABLE 1

DRAM's power consumption and SoC's power consumption in a DOU scenario

|  | DOU power consumption (milliampere-hours (mAh)) |
| --- | --- |
| SOC | 385 |
| DRAM | 60 |
| SOC + DRAM | 445 |

In addition, actual tests in a plurality of actual application scenarios comprehensively show that power consumption of a DRAM using IDD3P (an idle current in an active power-down (PD) state, where the current corresponds to an open page current) and IDD3N (an idle current in an active non-PD state, where the current corresponds to a close page current) account for 5% to 10% of overall power consumption of the DRAM. Refer to Table 2.

TABLE 2

Proportions of power consumption of DRAM using $I_{DD3P}$ and $I_{DD3N}$ for APP

| 415 megahertz (MHz) | Typing chat | Browsing moments | Browsing news | Watching video |
| --- | --- | --- | --- | --- |
| $I_{DD3N}$ | 7.2% | 7.4% | 5.5% | 3.8% |
| $I_{DD3P}$ | 2.8% | 2.4% | 1.1% | 0.8% |

How to reduce power consumption of the DRAM using IDD3P and IDD3N is of great significance to reduction of power consumption of the electronic product. Therefore, this application provides a memory management method, to reduce power consumption of a DRAM using IDD3P and IDD3N, and further reduce overall power consumption of the electronic product.

SUMMARY

Embodiments of this application provide a page status management method and a related device, to reduce power consumption of an electronic device.

According to a first aspect, an embodiment of this application provides a page status management method applied to various electronic devices. The method may include collecting statistics on N first memory access commands received in a first time window, determining reception interval information of the N first memory access commands, where the reception interval information indicates denseness of a stream of commands in the first time window, determining active standby time based on the reception interval information, and after a second memory access command accesses a target memory page, if no other memory access command accesses the target memory page within the active standby time, closing the target memory page, where the second memory access command is any memory access command received in a second time window, and the second time window is a time window after the first time window.

In this embodiment of this application, an electronic device may collect statistics on a plurality of memory access commands (namely, the N first memory access commands) received in the early first time window, and learn of a feature of a memory access behavior by determining the reception interval information of the memory access commands. Because a memory access behavior of a user has continuity to some extent, the electronic device may consider that a feature of an access behavior of the user in the late second time window is similar to or the same as a feature of an access behavior of the user in the early first time window. Therefore, the electronic device may determine (or predict), based on a feature of the memory access command received in the first time window, active standby time of a memory page accessed by the memory access command in the second time window, to close the memory page opened in the second time window in a timely and proper manner. This can reduce power consumption of a DRAM, and further reduce power consumption of the electronic device.

In a possible implementation, the reception interval information includes one or more of the following: time interval information for receiving the N first memory access commands or command density information of the N first memory access commands.

In this embodiment of this application, the reception interval information used to reflect the denseness of the stream of commands may be one or more of the following: time interval information of the commands or density information of the commands. The time interval information may be an average time interval, a median of time intervals, or the like. The electronic device can accurately determine, based on the parameters that can accurately reflect a feature of the stream of commands, a scenario corresponding to the stream of commands, to accurately predict active standby time of a memory page in a subsequent time window.

In a possible implementation, the reception interval information includes the time interval information for receiving the N first memory access commands, and the determining active standby time based on the reception interval information includes, when the time interval information is greater than or equal to a first interval value and less than or equal to a second interval value, determining a quantity of target commands in the N first memory access commands, where the target command is a rowhit command, and the second interval value is greater than the first interval value, and determining the active standby time based on the quantity of target commands.

In this embodiment of this application, when the time interval information is between two levels (the first interval value and the second interval value), the electronic device may consider that the stream of commands corresponds to a medium-sized command interval scenario, and further determine a quantity of rowhit commands, to adjust the active standby time of the memory page based on the quantity of rowhit commands. This ensures accuracy and reasonableness of adjustment.

In a possible implementation, determining, based on the quantity of target commands, the active standby time of the memory page accessed by the second memory access command includes, if the quantity of target commands is greater than or equal to a first value, determining a first duration as the active standby time, or if the quantity of target commands is less than the first value, determining a second duration as the active standby time, where the second duration is less than the first duration.

In this embodiment of this application, when the quantity of rowhit commands exceeds a threshold, the electronic device determines longer active standby time (namely, the first duration), or when the quantity of rowhit commands does not exceed a threshold, the electronic device determines shorter active standby time (namely, the second duration), to ensure accuracy and reasonableness of adjustment in different sub-scenarios.

In a possible implementation, the reception interval information includes the time interval information for receiving the N first memory access commands, and determining active standby time based on the reception interval information includes, when the time interval information is less than the first interval value or greater than the second interval value, determining a third duration as the active standby time, where the second interval value is greater than the first interval value.

In this embodiment of this application, when the time interval information is less than a lower level or greater than a higher level, the electronic device may consider that the scenario corresponding to the stream of commands is a command dense scenario or a command sparse scenario respectively, and determine short active standby time for the two scenarios, to meet power consumption and performance requirements.

In a possible implementation, a ratio of the first value to the quantity N of first memory access commands is greater than or equal to a preset ratio value.

In this embodiment of this application, a reference value (or a threshold, corresponding to the first value) used by the electronic device to determine the quantity of rowhit commands may be adjusted based on the quantity of memory access commands received in the time window, to further ensure determining accuracy.

In a possible implementation, the reception interval information includes the time interval information for receiving the N first memory access commands, the time interval information includes an average time interval at which the N first memory access commands are received, and determining reception interval information of the N first memory access commands includes determining a ratio of a width of the first time window to the quantity N of first memory access commands as the average time interval.

In this embodiment of this application, the electronic device may directly determine the average time interval of commands based on the width of the time window used for statistics collection and the quantity of memory access commands received in the window. A calculation amount is small, logic is simple, and efficiency is high.

In a possible implementation, the reception interval information includes the time interval information for receiving the N first memory access commands, the time interval information includes an average time interval at which the N first memory access commands are received, and determining reception interval information of the N first memory access commands includes determining a time interval at which each pair of the N−1 pairs of adjacent commands in the N first memory access commands is received, and determining a ratio of an accumulated value of time intervals at which the N−1 pairs of adjacent commands are received to the quantity N of first memory access commands as the average time interval.

In this embodiment of this application, the electronic device may determine the average time interval of commands based on an accumulated value of time intervals of a plurality of pairs of adjacent commands and the quantity of memory access commands received in the window, to eliminate interference, in calculation, caused by $1^{st}$ and last time periods, in the time window, in which no command arrives. This has high accuracy.

In a possible implementation, the reception interval information includes the time interval information for receiving the N first memory access commands, the time interval information includes an average time interval at which the N first memory access commands are received, and determining reception interval information of the N first memory access commands includes determining a time interval at which a $1^{st}$ command and a last command in the N first memory access commands are received, and determining a ratio of the time interval at which the $1^{st}$ command and the last command are received to the quantity N of first memory access commands as the average time interval.

In this embodiment of this application, the electronic device may determine the average time interval of commands based on the time interval between the $1^{st}$ command and the last command and the quantity of memory access commands received in the window, to eliminate interference, in calculation, caused by $1^{st}$ and last time periods, in the time window, in which no command arrives. This has high accuracy. In addition, only the time interval between the 1st command and the last command needs to be calculated, so that a calculation amount is small, and efficiency is high.

In a possible implementation, the reception interval information includes the time interval information for receiving the N first memory access commands, the time interval information includes a median of time intervals at which N-1 pairs of adjacent commands in the N first memory access commands are received, and determining reception interval information of the N first memory access commands includes determining a time interval at which each pair of the N-1 pairs of adjacent commands in the N first memory access commands is received, and determining the median from the time intervals of the N-1 pairs of adjacent commands.

In this embodiment of this application, the electronic device may use the median of the time intervals of the plurality of pairs of adjacent commands as a basis for adjusting the active standby time of the memory page, to eliminate interference caused by an extreme value in calculation in the case of using the average value. This has high accuracy.

In a possible implementation, each of the N first memory access commands and the second memory access command are used to access a same bank.

In this embodiment of this application, the electronic device may collect statistics on and confirm a feature of a stream of commands in only one bank in a memory, and further adjust only active standby time of the bank. In other words, when there is a plurality of banks in the memory, the electronic device may separately confirm features of streams of commands in different banks, to separately control active standby time of different banks, and further reduce overall power consumption of the device.

According to a second aspect, this application provides a page status management apparatus, including a first processing unit configured to collect statistics on N first memory access commands received in a first time window, a first determining unit configured to determine reception interval information of the N first memory access commands, where the reception interval information indicates denseness of a stream of commands in the first time window, a second determining unit configured to determine active standby time based on the reception interval information, and a second processing unit configured to, after a second memory access command accesses a target memory page, if no other memory access command accesses the target memory page within the active standby time, close the target memory page, where the second memory access command is any memory access command received in a second time window, and the second time window is a time window after the first time window.

In a possible implementation, the reception interval information includes one or more of the following: time interval information for receiving the N first memory access commands or command density information of the N first memory access commands.

In a possible implementation, the reception interval information includes the time interval information for receiving the N first memory access commands, and the second determining unit is further configured to, when the time interval information is greater than or equal to a first interval value and less than or equal to a second interval value, determine a quantity of target commands in the N first memory access commands, where the target command is a rowhit command, and the second interval value is greater than the first interval value, and determine the active standby time based on the quantity of target commands.

In a possible implementation, the second determining unit is further configured to, if the quantity of target commands is greater than or equal to a first value, determine a first duration as the active standby time, or if the quantity of target commands is less than the first value, determine a second duration as the active standby time, where the second duration is less than the first duration.

In a possible implementation, the reception interval information includes the time interval information for receiving the N first memory access commands, and the second determining unit is further configured to, when the time interval information is less than the first interval value or greater than the second interval value, determine a third duration as the active standby time, where the second interval value is greater than the first interval value.

In a possible implementation, a ratio of the first value to the quantity N of first memory access commands is greater than or equal to a preset ratio value.

In a possible implementation, the reception interval information includes the time interval information for receiving the N first memory access commands, the time interval information includes an average time interval at which the N first memory access commands are received, and the first determining unit is further configured to determine a ratio of a width of the first time window to the quantity N of first memory access commands as the average time interval.

In a possible implementation, the reception interval information includes the time interval information for receiving the N first memory access commands, the time interval information includes an average time interval at which the N first memory access commands are received, and the first determining unit is further configured to determine a time interval at which each pair of the N-1 pairs of adjacent commands in the N first memory access commands is received, and determine a ratio of an accumulated value of time intervals at which the N-1 pairs of adjacent commands are received to the quantity N of first memory access commands as the average time interval.

In a possible implementation, the reception interval information includes the time interval information for receiving the N first memory access commands, the time interval information includes an average time interval at which the N first memory access commands are received, and the first determining unit is further configured to determine a time interval at which a $1^{st}$ command and a last command in the N first memory access commands are received, and determine a ratio of the time interval at which the $1^{st}$ command and the last command are received to the quantity N of first memory access commands as the average time interval.

In a possible implementation, the reception interval information includes the time interval information for receiving the N first memory access commands, the time interval information includes a median of time intervals at which N-1 pairs of adjacent commands in the N first memory access commands are received, and the first determining unit is further configured to determine a time interval at which each pair of the N-1 pairs of adjacent commands in the N first memory access commands is received, and determine the median from the time intervals of the N-1 pairs of adjacent commands.

In a possible implementation, each of the N first memory access commands and the second memory access command are used to access a same bank.

According to a third aspect, this application provides a memory controller. The memory controller may include a page status management module configured to perform the method in any one of the first aspect or the possible implementations of the first aspect. Optionally, the memory controller may further include a command processing module, a data processing module, and a refresh module. The command processing module may be configured to process an instruction sent by a processor. The data processing module may be configured to process data that is read or written by the processor into a memory. The refresh module may be configured to refresh a memory according to a refresh command.

According to a fourth aspect, this application provides a page status management apparatus. The apparatus may include a processor, a transceiver, and a storage. The storage is configured to store a computer program, the transceiver is configured to receive/send various messages, the computer program includes program instructions, and when the processor runs the program instructions, the apparatus is enabled to perform the method in any one of the first aspect or the possible implementations of the first aspect. The transceiver may be a radio frequency module, a combination of a radio frequency module and an antenna, or an input/output interface of a chip or a circuit in the apparatus.

According to a fifth aspect, this application provides a computer-readable storage medium. The computer-readable storage medium stores program instructions, and when the program instructions are run on a computer, the computer is enabled to perform the method in any one of the first aspect or the possible implementations of the first aspect.

According to a sixth aspect, this application provides a program product including program instructions. When the program product runs, the method in any one of the first aspect or the possible implementations of the first aspect is performed.

According to a seventh aspect, this application provides a page status management apparatus. The apparatus may be implemented in a form of a chip, or may be implemented in a form of a device. The apparatus includes a processor. The processor is configured to read and execute a program stored in a storage, to perform the method in any one of the first aspect or the possible implementations of the first aspect. Optionally, the apparatus further includes the storage, and the storage is connected to the processor through a circuit. Further, optionally, the apparatus further includes an interface, and the processor is connected to the interface. The interface is configured to receive a to-be-processed data packet and/or to-be-processed information. The processor obtains the data packet and/or the information through the interface, processes the data packet and/or the information, and outputs a processing result through the interface. The interface may be an input/output interface.

Optionally, the processor and the storage may be physically mutually independent units, or the storage may be integrated with the processor.

According to an eighth aspect, an embodiment of this application provides an electronic device. The electronic device includes a processor, and the processor is configured to support the electronic device in implementing a corresponding function in the page status management method provided in the first aspect. The electronic device may further include a storage. The storage is configured to be coupled to the processor, and the storage stores program instructions and data that are necessary for the electronic device. The electronic device may further include a communication interface, used for communication between the electronic device and another device or a communication network.

According to a ninth aspect, an embodiment of this application provides a chip system. The chip system includes a processor configured to support a device in implementing functions in the first aspect, for example, generating or processing information, an instruction, or a command in the page status management method. In a possible design, the chip system further includes a storage, and the storage is configured to store program instructions and data that are necessary for the device. The chip system may include a chip, or may include a chip and another discrete component.

For technical effect achieved by the foregoing aspects, refer to each other or beneficial effect in the following method embodiments. Details are not described herein again.

BRIEF DESCRIPTION OF DRAWINGS

To describe technical solutions in embodiments of this application more clearly, the following describes the accompanying drawings for describing embodiments of this application. It is clear that the accompanying drawings in the following descriptions merely show some embodiments of this application, and a person of ordinary skill in the art can derive other drawings from these accompanying drawings without creative efforts.

DESCRIPTION OF EMBODIMENTS

Figure 1:
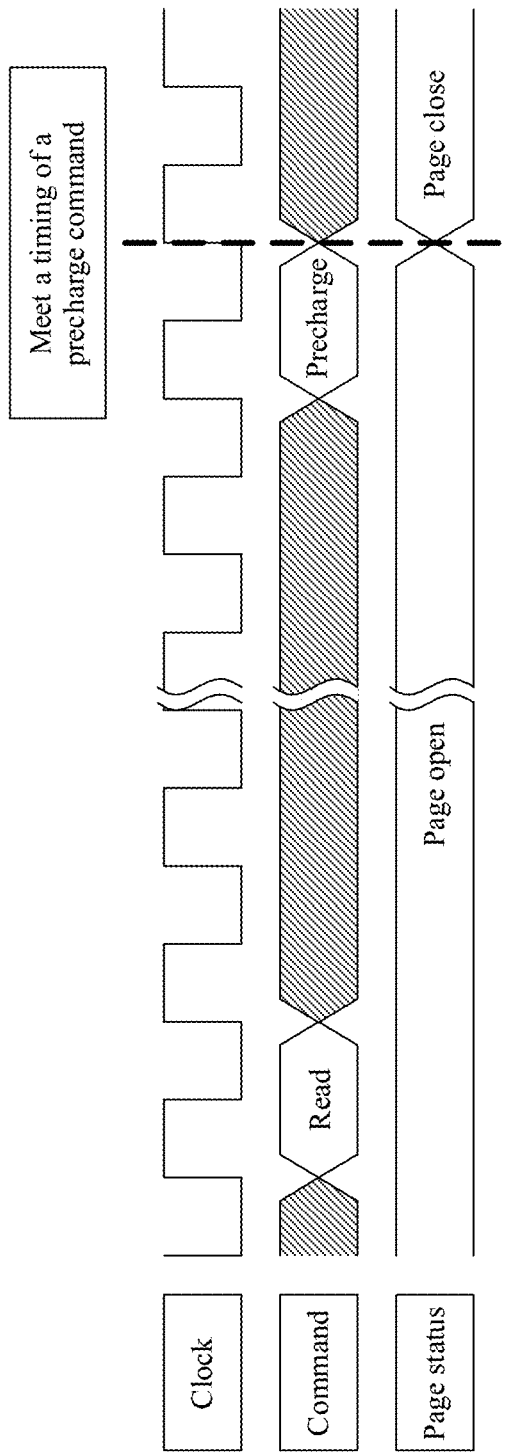
FIG. 1 is a diagram of a timing status of a close page solution.

The following describes embodiments of this application with reference to the accompanying drawings in embodiments of this application.

In the specification, claims, and the accompanying drawings of this application, terms such as "first", "second", "third", and "fourth" are intended to distinguish between different objects but do not describe a particular order. In addition, terms "include", "have", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in one or more embodiments of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

First, some terms in this application are described, to facilitate understanding of a person skilled in the art.

(1) DRAM: The DRAM usually includes a plurality of banks, each bank is a two-dimensional (2D) array including a plurality of rows and columns, and each bank includes a plurality of memory units. Two steps need to be performed to access the memory unit: searching for an address of a row in a bank, and then searching for an address of a specific column in the selected row. A last operation performed on the row is precharge, and a new row can be accessed only after the operation is completed. Such an operation is also referred to as closing an opened row.

(2) Common basic memory commands: The common basic memory commands include an active command, a read command, a write command, a precharge command, and a refresh command. The active command is used to select a row in a bank in an idle state, so that the row enters a read/write preparation state. The read command and the write command are used to read and write data from and in a specific column corresponding to an activated row. The precharge command is used to, after the read command and the write command are executed, if another row needs to be addressed, close the opened row. The refresh command is used to refresh all rows in a fixed cycle, to avoid data loss caused by leakage of charges stored in a capacitor for a long time.

(3) Page: A row in the DRAM may be referred to as a memory page, which is referred to as a memory page, a page, or the like, and the page is a minimum unit activated to access the DRAM for one time. In embodiments of this application, one page corresponds to one row in one bank. Once the page is opened (that is, the row is opened), a plurality of sequential or different column addresses in the row can be accessed.

(4) Rowhit command: When a row to be accessed by a command is consistent with an opened row in a current bank, the command is referred to as a rowhit command. On the contrary, if a row to be accessed by a command is not consistent with an opened row in a current bank, the command is referred to as a rowmiss command. In some embodiments of this application, some commands are also counted as rowhit commands. For example, when a row to be accessed by a command is consistent with a row accessed by a previous command, although the row is closed, it may be considered that the row is closed by mistake. In this case, the command may also be counted as the rowhit command.

(5) "A plurality of" in this application means two or more than two. The term "and/or" describes an association relationship for describing associated objects and represents that three relationships may exist. For example, A and/or B may represent the following three cases: only A exists, both A and B exist, and only B exists. The character "/" usually indicates an "or" relationship between the associated objects.

First, a technical problem to be resolved in this application is analyzed and proposed. In the technology, there are the following common page status management solutions.

Solution 1: Close page solution:

FIG. 1 is a diagram of a timing status of a close page solution. After a memory page is accessed by a memory access command (for example, a read command), if no command that accesses a same row in a same bank as the read command, that is, there is no command that accesses a same page, the page is directly closed when a timing requirement of a precharge command is met.

Solution 1 has the following disadvantages: lack of adaptability and incapable of meeting requirements of various scenarios as the page status management manner is fixed, and in some application scenarios, more power consumption and larger performance loss. For example, after an accessed memory page is closed upon ending of access of the memory access command, the page needs to be reactivated for access because a command for accessing the page arrives, which additionally increases power consumption and a delay caused by the active command.

Figure 2:
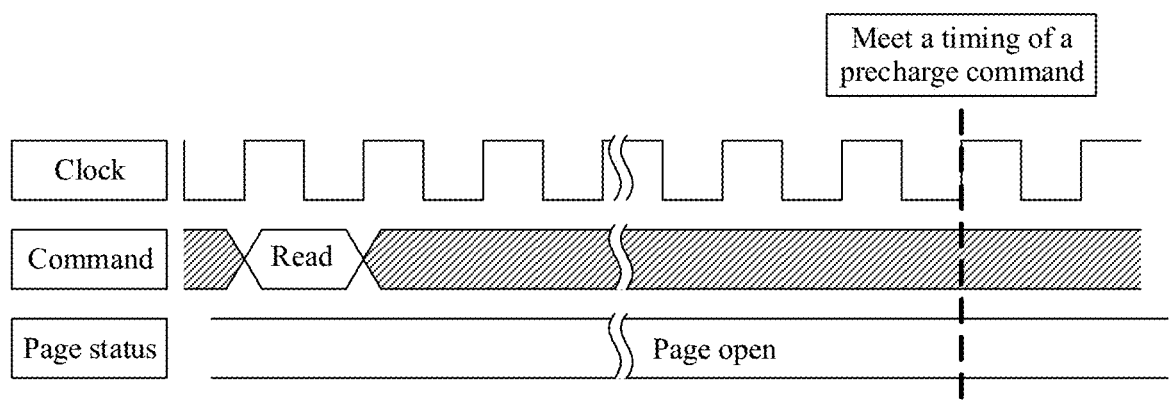
FIG. 2 is a diagram of a timing status of an open page solution.

Solution 2: Open page solution:

FIG. 2 is a diagram of a timing status of an open page solution. After a memory page is accessed by a memory access command (for example, a read command), the page is not actively closed when the timing requirement of the precharge command is met. The page is closed until a command (namely, a command for accessing another page) for accessing another row or a refresh command arrives.

Solution 2 has the following disadvantages: lack of adaptability and incapable of meeting requirements of various scenarios as the page status management manner is fixed, and in some application scenarios, more power consumption and larger performance loss. For example, after access of the memory access command ends, if no memory access command arrives, the page is always in an active state until a refresh command arrives, which wastes power consumption.

Figure 3:
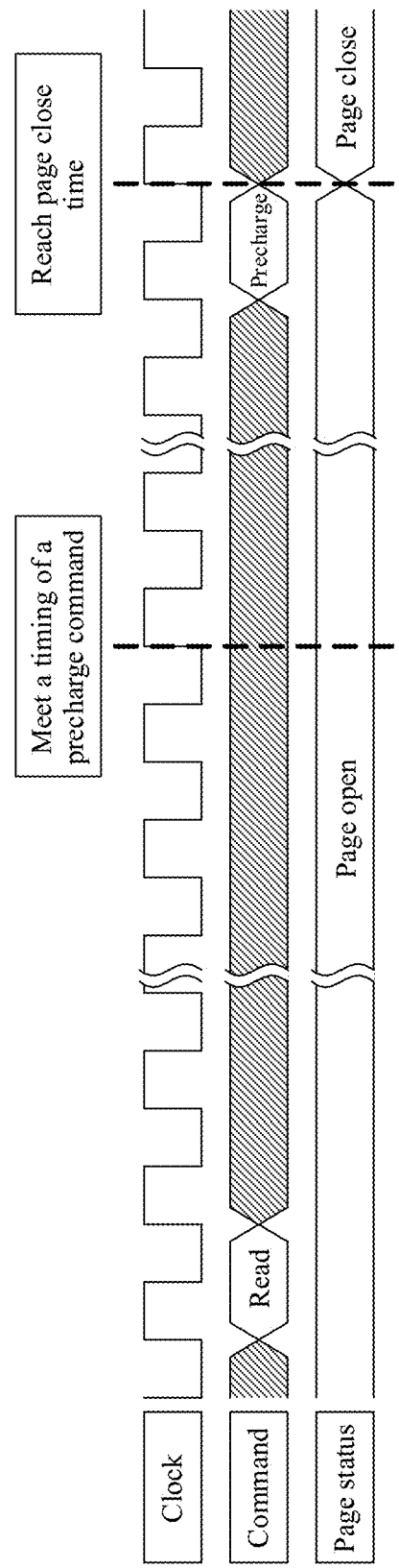
FIG. 3 is a diagram of a timing status of an open page timeout solution.

Solution 3: Open page timeout solution:

FIG. 3 is a diagram of a timing status of an open page timeout solution. After a memory page is accessed by a memory access command (for example, a read command), the page is not actively closed when the timing requirement of the precharge command is met, instead, a timer is enabled to start timing, and the page is closed upon timeout of the timer.

Solution 3 has the following disadvantages: lack of adaptability and incapable of meeting requirements of various scenarios as the page status management manner is fixed, and in some application scenarios, more power consumption and larger performance loss. For example, after access of the memory access command ends, if no memory access command arrives, the page is always in an active state until the timer times out, which wastes power consumption.

Figure 4:
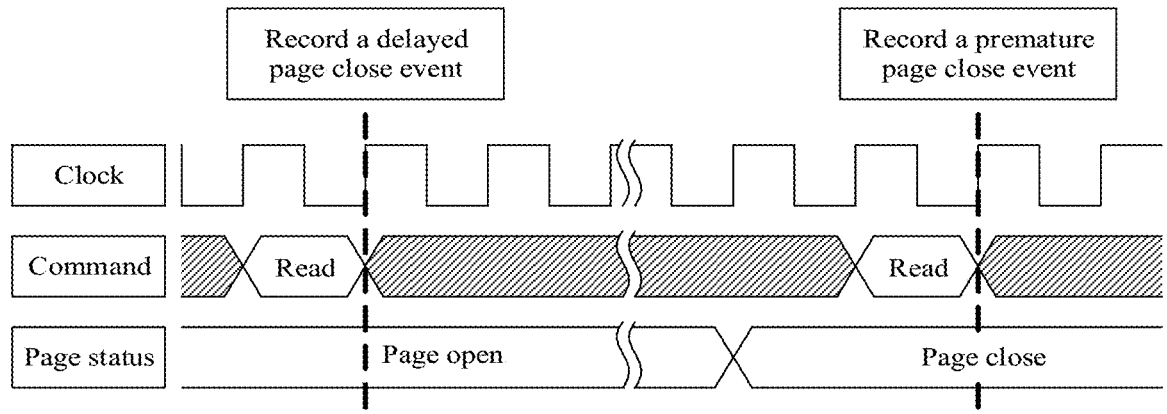
FIG. 4 is a diagram of a timing status of a page adapt solution.

Solution 4: Page adapt solution:

FIG. 4 is a diagram of a timing status of a page adapt solution. When a memory access command enters a dynamic memory controller (DMC), if a delay is increased because a page is closed too early, a premature page close event is recorded. If a delay is increased because a page is closed too late, a delayed page close event is recorded. In a window with a specific quantity of commands, if a quantity of premature page close events exceeds a threshold, automatic page close time (corresponding to active standby time) is increased. If a quantity of delayed page close events exceeds a threshold, automatic page close time is decreased.

Solution 4 has the following disadvantages: The page status management manner has some adaptability, but a determining manner of the page status management manner is not accurate enough. For example, when a page is opened but is not accessed by a command for a long time, the page needs to be closed as soon as possible. However, when the page is accessed by a command after the page is closed, it may be considered as a premature page close event. In addition, a step used for adjusting the automatic page close time is fixed, single adjustment may fail to meet an adjustment requirement in the case of a small step, and excessive adjustment may occur in the case of a large step. Therefore, in most scenarios, this solution may not keep up with changes of a memory access behavior of a user, and has complex logic and high power consumption.

To reduce power consumption of an electronic device, in consideration of disadvantages of the technology, this application provides a page status management method and a related device, to determine a scenario type of a memory access command based on a feature of a current stream of commands, so as to dynamically adjust page active standby time based on different scenarios, and further to achieve the purpose of reducing power consumption of the electronic device. For example, statistics may be collected on a plurality of memory access commands received in a current time window, and an average time interval (which may be a parameter like a median of time intervals or command density information) between the memory access commands is determined. Different average time intervals correspond to different scenarios (for example, a command dense scenario, a command sparse scenario, and a medium-sized command interval scenario). Active standby time is separately configured for different scenarios, and active standby time corresponding to a scenario may be used in a subsequent time window, to close an opened memory page in a timely and proper manner, and further to reduce power consumption. For a case in which the average time interval is small (that is, corresponding to a command dense scenario) or a case in which the average time interval is large (that is, corresponding to a command sparse scenario), short active standby time may be set. For a case in which the average time interval is medium (that is, corresponding to a medium-sized command interval scenario), a quantity of rowhit commands in a plurality of received memory access commands may be further determined. When the quantity of rowhit commands is large, long active standby time may be set, to facilitate direct access of the rowhit command, otherwise, short active standby time is set, to close an opened page as soon as possible, so as to reduce power consumption and a delay.

To better understand the page status management method provided in embodiments of this application, the following describes, with reference to more accompanying drawings, technical solutions provided in this application.

In this application, unless otherwise specified, for same or similar parts of embodiments or implementations, refer to each other. In embodiments of this application and the implementations/methods/implementation methods in embodiments, unless otherwise specified or a logical conflict occurs, terms and/or descriptions are consistent and may be mutually referenced between different embodiments and between the implementations/methods/implementation methods in embodiments. Technical features in the different embodiments and the implementations/methods/implementation methods in embodiments may be combined to form a new embodiment, implementation, or implementation method based on an internal logical relationship thereof. The following implementations of this application are not intended to limit the protection scope of this application.

The following first describes, by using examples, application scenarios to which the page status management method provided in embodiments of this application can be applied. It may be understood that a structure and an application scenario of a memory chip described in embodiments of this application are intended to describe the technical solutions in embodiments of this application more clearly, and do not constitute any limitation on the technical solutions provided in embodiments of this application.

Figure 5A:
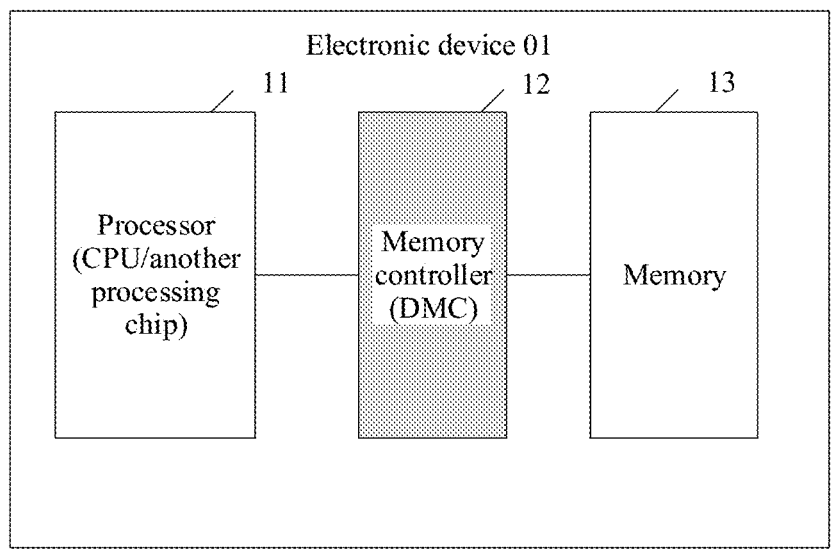
FIG. 5A is a diagram of a structure of an electronic device according to an embodiment of this application.

FIG. 5A is a diagram of a structure of an electronic device according to an embodiment of this application. An electronic device 01 provided in this application may include one or more processors 11, one or more memory controllers 12, and one or more memories 13. The electronic device may further include a power management unit, an external storage, and the like (not shown in FIG. 5A). For example, the electronic device 01 may be a mobile intelligent terminal, for example a subscriber unit, a cellular phone, a smartphone, a personal digital assistant (PDA) computer, a tablet computer, a handheld device (or handset), a laptop computer, a machine-type communication (MTC) terminal, an autonomous driving terminal, an intelligent wearable device, and a smart speaker, or may be various non-mobile terminal devices (namely, fixed terminals) that need to use a memory.

The processor 11 may be a CPU, a graphics processing unit (GPU), an SOC, a microcontroller unit (MCU), or a chip having another function. The processor 11 may implement data exchange with the memory 13 by using the memory controller 12. For example, when executing a memory access instruction, the CPU may send a read/write request to a memory management unit (MMU). After performing translation between a virtual address and a physical address, the memory management unit sends a memory access command to a bus. The bus transfers the memory access command to the memory controller 12. The memory controller 12 translates the address, and performs data access on a corresponding memory chip of the memory 13.

Figure 5B:
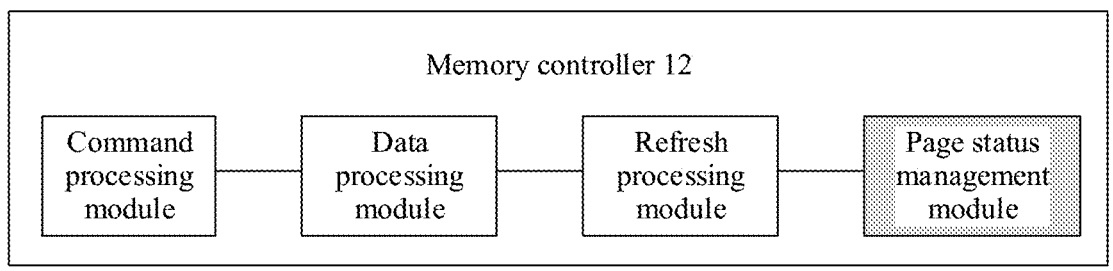
FIG. 5B is a diagram of a structure of a memory controller according to an embodiment of this application.

The memory controller 12 may be a DMC, and is mainly configured to control data transmission between the processor 11 and the memory 13. The memory controller 12 and the processor 11 may be deployed on a same chip, or may be deployed on separate chips. In other words, the memory controller 12 may be integrated into a chip of the processor 11 (for example, a CPU), or may be a separate chip independent of the processor 11. This is not limited herein. As shown in FIG. 5B, the memory controller may usually include a command processing module, a data processing module, a refresh module, and the like. The command processing module is configured to process an instruction sent by the processor 11. The data processing module is configured to process data that is read or written by the processor 11 from or into the memory 13. The refresh module is configured to refresh the memory 13 according to a refresh command. In addition, in embodiments of this application, the memory controller further includes a page status management module configured to implement the page status management method provided in this application, that is, managing, based on a feature of a stream of commands, a status of a memory page opened by a memory access command, and determining active standby time in different scenarios, to close the opened memory page in a timely and proper manner. This effectively reduces power consumption of a DRAM, further reduces power consumption of a device, and improves performance.

The memory 13 may be a DRAM, a pseudo-static RAM (PSRAM), a static RAM (SRAM), another storage medium used for storage, for example, a read-only memory (ROM), an electrically erasable programmable ROM (EEPROM), an optical disc ROM (e.g., compact disc (CD) ROM (CD-ROM)), a removable medium, an optical disc storage, a magnetic storage medium, a magnetic storage device, a flash memory, a register, a state storage, a remote mounted storage, or a local or remote storage component, or any other medium capable of carrying or storing software, data, or information and accessible by a processor/computer. The memory 13 is a location where a process and data are temporarily stored, and is usually referred to as a main memory. The memory 13 is made of a semiconductor component, and is storage space that can be directly addressed by the processor 11 or an external device (a timer, an analog-to-digital converter, or the like, which is not shown in the figure) with various functions. Usually, the memory is characterized by a small capacity and a high access speed, and only temporarily stores information (data processed by the processor), and the information disappears after the memory is powered off. The DRAM is a most commonly used memory in a computer system. Therefore, in embodiments of this application, an example in which the DRAM is used as a memory is also used for description. Page status management is implemented based on a feature of a stream of commands, to control active standby time (that is, time at which an opened page is closed) of a memory page for different memory access scenarios in a timely and proper manner. This reduces power consumption of the DRAM, and further reduces power consumption of an electronic device.

In addition, the electronic device 01 may further include a power management unit configured to supply power to the processor 11, the memory controller 12, and the memory 13, or supply power to another component or module in the electronic device 01.

The electronic device 01 may further include one or more interfaces, used for communication between the electronic device 01 and another device. In some embodiments, the interface may include a wire for coupling a wired connection, or a pin for coupling a wireless transceiver, or a chip and/or a pin for a wireless connection. In some embodiments, the interface may include a transmitter, a receiver, a transceiver, and/or an antenna.

It should be noted that embodiments of this application may be applied to various computer system architectures. The architecture in FIG. 5A is merely an example implementation in embodiments of this application, and should not constitute any limitation on this application. An architecture to which embodiments of this application can be applied includes but is not limited to the foregoing architecture. It should be understood that the electronic device 01 may have more or fewer units/modules than those shown in FIG. 5A, or may combine two or more units/modules, or may have different unit/module configurations. Various units/modules shown in FIG. 5A may be implemented in hardware, software, or a combination of hardware and software. The hardware, software, or the combination of hardware and software include one or more signal processing and/or application-specific integrated circuits. This is not limited in embodiments of this application.

For ease of understanding, with reference to more accompanying drawings, the following describes technical solutions provided in this application.

In this application, unless otherwise specified, for same or similar parts of embodiments or implementations, refer to each other. In embodiments of this application and the implementations/methods/implementation methods in embodiments, unless otherwise specified or a logical conflict occurs, terms and/or descriptions are consistent and may be mutually referenced between different embodiments and between the implementations/methods/implementation methods in embodiments. Technical features in the different embodiments and the implementations/methods/implementation methods in embodiments may be combined to form a new embodiment, implementation, or implementation method based on an internal logical relationship thereof. The following implementations of this application are not intended to limit the protection scope of this application.

Figure 6:
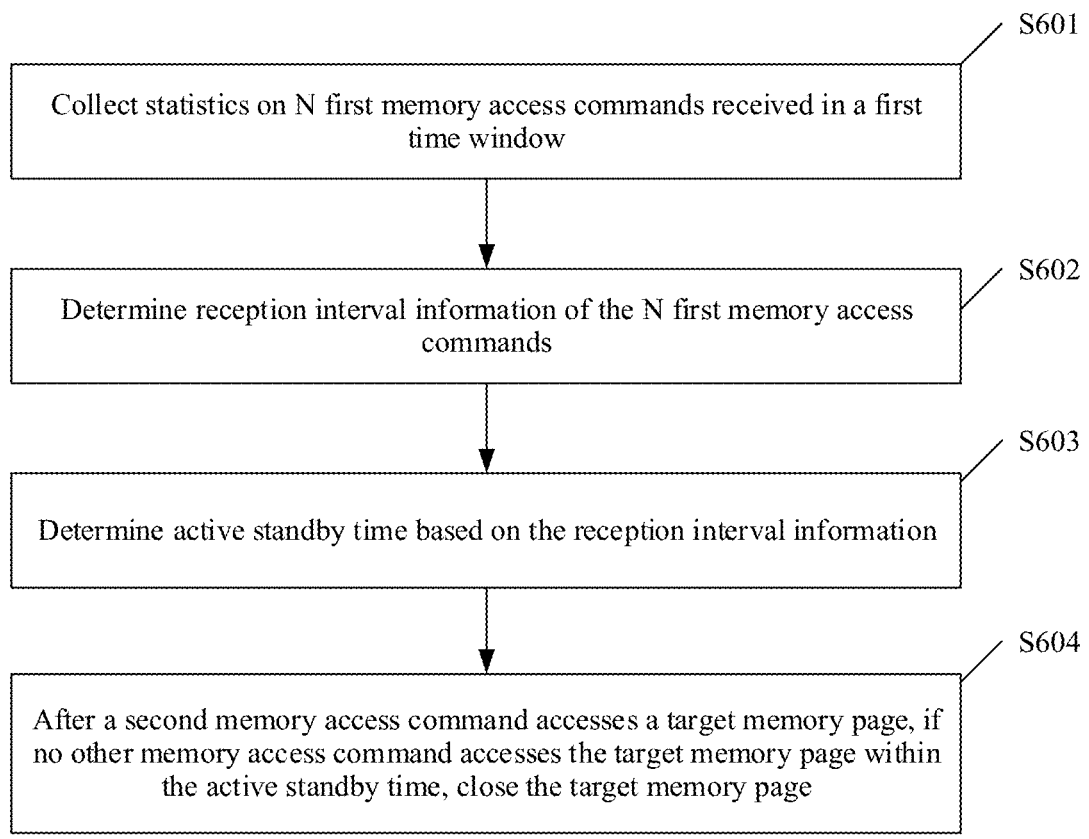
FIG. 6 is a schematic flowchart of a page status management method according to an embodiment of this application.

FIG. 6 is a schematic flowchart of a page status management method according to an embodiment of this application. The method may be applied to the electronic device 01 shown in FIG. 5A. Further, the method may be applied to the processor 11, the memory controller 12, or another independent chip of the electronic device 01. An example in which the method is applied to the memory controller 12 is used for description in embodiments of this application. As shown in FIG. 6, the page status management method provided in this embodiment of this application may include but is not limited to the following steps:

S601: Collect statistics on N first memory access commands received in a first time window.

S602: Determine reception interval information of the N first memory access commands.

S603: Determine active standby time based on the reception interval information.

S604: After a second memory access command accesses a target memory page, if no other memory access command accesses the target memory page within the active standby time, close the target memory page.

The reception interval information indicates denseness of a stream of commands in the first time window. The stream of commands means one or more commands received and processed within specific time, for example, the N first memory access commands in the first time window. The feature is a measurable or quantifiable attribute of an object. The denseness indicates a density degree of commands in the stream of commands, and may be roughly classified into sparse, medium, and dense. The second memory access command is any memory access command received in a second time window, and the second time window is a time window after the first time window. For example, the second time window may be a time window following the first time window, or may include several time windows following the first time window. For ease of understanding, in this embodiment of this application, an example in which the second time window is a time window following the first time window is used for description. Active standby time (or page active standby time) of a memory page is time from time at which the memory page is in an active (open) state to time at which the memory page is closed after a memory access command accesses the memory page. In other words, if no other memory access command accesses the memory page within the active standby time, the memory page may be closed. It should be noted that, if a new memory access command accesses the page within the active standby time, the active standby time of the page needs to be recalculated. It should be further noted that, if the active standby time is less than write recovery time, the memory page may be closed after the write recovery time is reached, instead of being directly closed after the active standby time is reached, to ensure reliable data writing.

In a possible implementation, the reception interval information may include one or more of the following: time interval information for receiving the N first memory access commands or command density information of the N first memory access commands. The time interval information may include one or more of the following: an average time interval (namely, a mean value) at which the N first memory access commands are received or a median (namely, a median value) of time intervals at which N−1 pairs of adjacent commands in the N first memory access commands are received. The time interval information indicates a time difference between adjacent commands, namely, a time interval between the adjacent commands, in a unit of second (s), millisecond (ms), or microsecond (μs). The command density information indicates a quantity of commands per unit time in a unit of piece per second (piece/s), piece per millisecond (piece/ms), piece per microsecond (piece/μs), or the like. Optionally, the reception interval information may also include a variance value, a standard deviation value, or the like of the time intervals at which the N−1 pairs of adjacent commands are received, or another statistical parameter that may indicate the denseness of the stream of commands. Examples are not enumerated one by one herein. For ease of understanding, in embodiments of this application, an example in which the reception interval information is the average time interval is mainly used for description, that is, an example in which active standby time of a memory page accessed by the second memory access command is determined based on the average time interval is used.

For example, the memory controller 12 may collect statistics on a plurality of memory access commands (namely, the N first memory access commands) received in the early first time window, and learn of a feature of a memory access behavior by determining an average time interval of the memory access commands. Because a memory access behavior of a user has continuity to some extent, the memory controller 12 may consider that a feature of an access behavior of the user in the second time window is similar to or the same as a feature of an access behavior of the user in the first time window. Therefore, the memory controller 12 may determine (or predict), based on the average time interval of the memory access commands received in the first time window, the active standby time of the memory page accessed by the memory access command in the second time window. This can reduce power consumption of a DRAM, and further reduce power consumption of the electronic device.

Figure 7A:
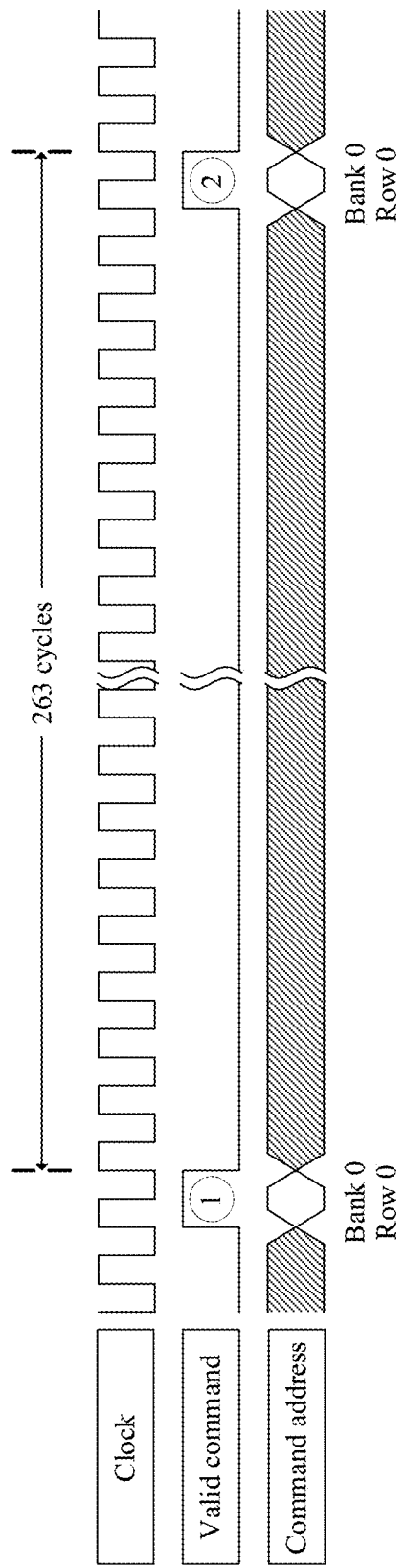
FIG. 7A is a diagram of a timing status of a command sparse scenario according to an embodiment of this application.

For ease of understanding, streams of commands of a memory access behavior during actual application are classified based on scenarios, including the following several example scenarios:

(1) Command sparse scenario: As shown in FIG. 7A, memory access commands are sparse, that is, a time interval between the memory access commands is large. For example, there are 263 cycles between a memory access command 1 and a memory access command 2 that are adjacent. It may be assumed that the memory access command 1 and the memory access command 2 access a same memory page. If page active standby time is excessively long, power consumption caused by page active standby may be greater than a sum of power consumption of a precharge command used to close a page and power consumption of an active command used to reopen the page. In this case, the active standby time wastes power consumption. However, if the memory access command 1 and the memory access command 2 access different memory pages, and the memory access command 2 needs to perform memory access, a memory page opened by the memory access command 1 definitely needs to be closed using a precharge command, and a memory page to be accessed by the memory access command 2 is opened using an active command. In this case, power consumption during page active standby time is wasted. In conclusion, for the foregoing command sparse scenario, after access of the memory access command 1 in FIG. 7A ends, if the memory page can be immediately closed (actually, due to write recovery time, the memory page is not immediately closed after the access ends), power consumption caused by the page active standby can be reduced. Therefore, short page active standby time may be set (even may be set to 0).

It should be noted that, if the page active standby time is set to 0, the memory controller 12 may carry a precharge indication (which may be understood as that one command includes two functions) when sending a read/write command, to directly close the page when the read/write command ends accessing the page and write recovery time requirement is met. If a rowhit command arrives during waiting for writing back, the rowhit command cannot directly access the page.

Figure 7B:
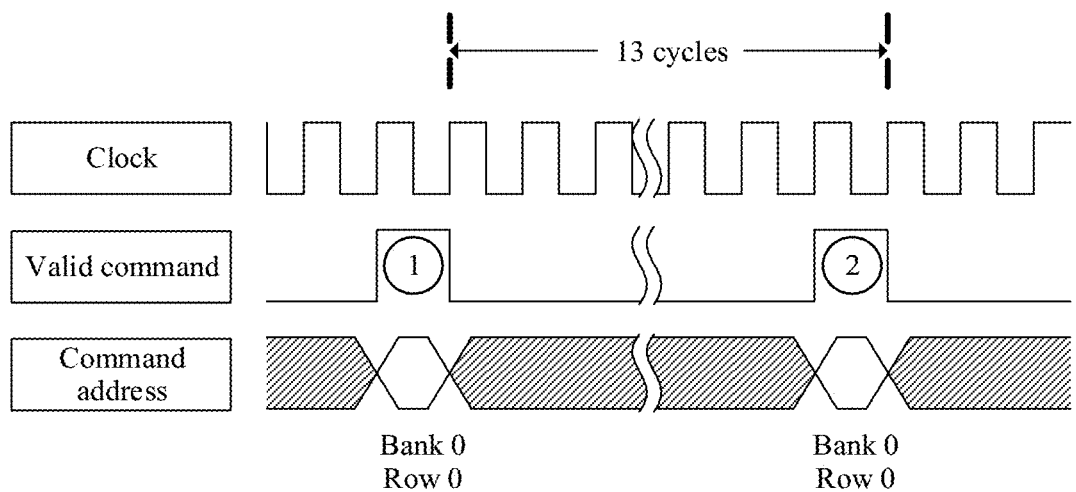
FIG. 7B is a diagram of a timing status of a command dense scenario according to an embodiment of this application.
Figure 7C:
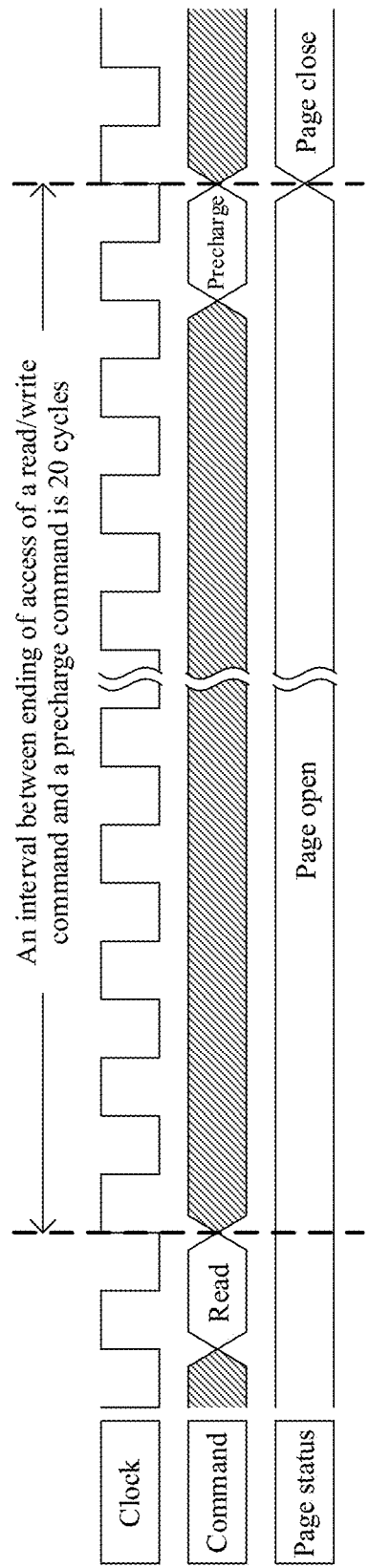
FIG. 7C is a diagram of a timing status of write recovery time according to an embodiment of this application.
Figure 7D:
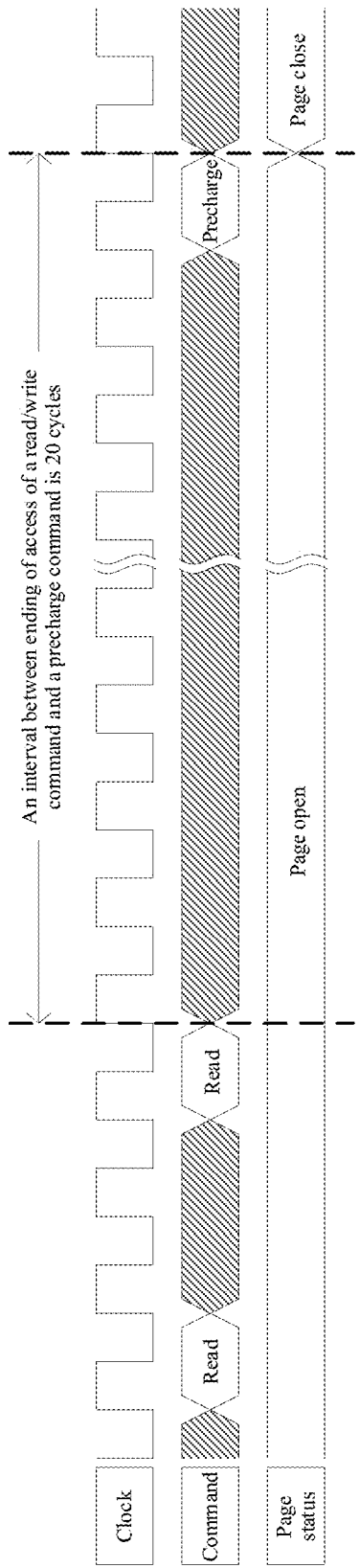
FIG. 7D is a diagram of a timing status of other write recovery time according to an embodiment of this application.

(2) Command dense scenario: As shown in FIG. 7B, memory access commands are dense, that is, a time interval between the memory access commands is small. For example, there are 13 cycles between a memory access command 1 and a memory access command 2 that are adjacent. It should be noted that a read/write operation of the DRAM is destructive, that is, the read/write operation damages data in a row. Therefore, when a read/write operation performed on a row ends, data needs to be recovered to the row, and actual writing of the data needs to be ensured by a sufficient time cycle, where the time is write recovery time (tWR). It is assumed that the time is 20 cycles. In other words, the precharge and the write operation cannot be simultaneously performed, and a precharge command can be sent only after tWR. As shown in FIG. 7C, after a read command is sent, a precharge command cannot be sent immediately, but standby time is required. If no memory access command for accessing a same page exists within the standby time, the precharge command may be sent after the time is reached, to ensure reliable data writing. Otherwise, the rewritten data may be incorrect. As shown in FIG. 7D, during the write recovery time, if another memory access command for accessing a same page arrives, the memory access command may be directly sent, and time from ending of access of the read/write command to the precharge command needs to be recalculated. In other words, the write recovery time needs to be recalculated, to ensure that the data is correctly rewritten after access of the subsequent memory access command ends.

For the command dense scenario, after access of a memory access command ends, a new memory access command may arrive in write recovery time of the memory access command. For example, in FIG. 7B, after access of the memory access command 1 ends, the memory access command 2 arrives after 13 cycles, and is still in a range of the write recovery time (20 cycles). If the memory access command 2 and the memory access command 1 access a same page, the memory access command 2 may be directly sent. If the memory access command 2 and the memory access command 1 access different pages, after the write recovery time ends, the page opened by the memory access command 1 may be directly closed using the precharge command, and the page that the memory access command 2 wants to access is activated. Therefore, for the command dense scenario, short page active standby time may be set. Due to the write recovery time, an opened page can be closed only when the write recovery time ends.

Figure 7E:
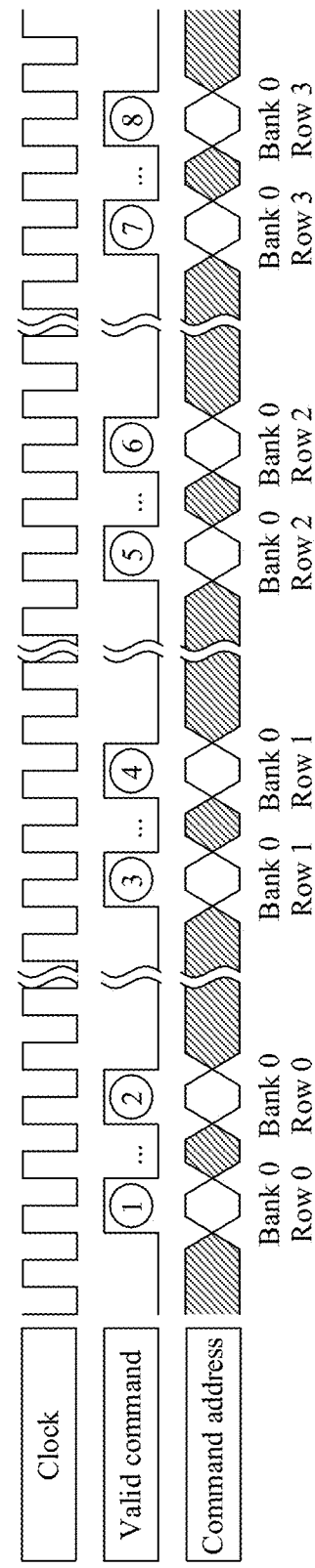
FIG. 7E is a diagram of a timing status of a medium-sized command interval scenario according to an embodiment of this application.

(3) Medium-sized command interval scenario: As shown in FIG. 7E, memory access commands are not dense or sparse, that is, a time interval between the memory access commands is medium. In this case, if a page is directly closed after a memory access command is executed, the page is reactivated by several subsequent memory access commands. If the memory access commands are rowhit commands (that is, accessing a same page), power consumption is wasted and performance deteriorates. In this case, if there is long page active standby time after the memory access command is executed, that is, a period of time needs to be waited for to close the page, the currently opened page may need to be closed first if several memory access commands that subsequently arrive are rowmiss commands (that is accessing different pages), and a to-be-accessed page is opened. Consequently, power consumption is also wasted and performance also deteriorates. Therefore, for the medium-sized command interval scenario, a quantity of rowhit commands needs to be further determined. When the quantity of rowhit commands is large, long page active standby time may be set, and power consumption caused by page active standby is less than power consumption of a page close command and an active command. When the quantity of rowhit commands is small, it indicates that an address accessed by a memory access behavior is random, and memory pages to be accessed by adjacent memory access commands may not be a same page, and short page active standby time may be set (even set to 0).

In view of this, after the reception interval information (for example, the average time interval) of the plurality of memory access commands received in the first time window is determined in step S602, a specific scenario corresponding to the stream of commands at the average time interval may be determined, that is, a command sparse scenario, a command dense scenario, or a medium-sized command interval scenario, and page active standby time is adjusted for different scenarios, to reduce power consumption of the electronic device.

In a possible implementation, when determining the page active standby time based on the reception interval information (for example, the average time interval), the memory controller 12 may preset two interval values (namely, a first interval value and a second interval value), where the second interval value is greater than the first interval value. When the average time interval is greater than or equal to the first interval value and is less than or equal to the second interval value, it may be considered that the stream of commands in the first time window corresponds to the medium-sized command interval scenario, the quantity of rowhit commands in the N first memory access commands that are counted in step S601 needs to be further determined. Finally, the page active standby time of the memory page accessed by the memory access command in the second time window may be determined based on the quantity of rowhit commands. For example, the first interval value may be a value equal to the write recovery time, and the second interval value may be 1.5 or 2 times the write recovery time, or the second interval value may be determined based on an actual parameter (for example, power consumption of the active command, power consumption of the page close command, active-standby power consumption, and idle-standby power consumption) of the DRAM. For example, the memory controller 12 may determine total power consumption of the active command and the page close command in the DRAM, and a difference between power consumption of page active standby in each clock cycle and power consumption of page idle standby in each clock cycle in the DRAM, further determine a quantity of clock cycles (for example, 50 clock cycles) after which the standby power consumption exceeds the total power consumption of the active command and the close command, and set the 50 clock cycles as the second interval value. It should be noted that the first interval value and the second interval value may alternatively be other values, and for DRAMs of different manufacturers, different models, and different processes, write recovery time and various power consumption parameters of the DRAMs may alternatively be other different values. This is not limited herein.

Optionally, for the medium-sized command interval scenario, when determining the quantity of rowhit commands, the memory controller 12 may preset a threshold (namely, a first value). When the quantity of rowhit commands is greater than or equal to the first value, it is considered that the quantity of rowhit commands is large, and a first duration may be determined as the page active standby time of the memory page accessed by the memory access command in the second time window. When the quantity of rowhit commands is less than the first value, it is considered that the quantity of rowhit commands is small, and a second duration may be determined as the page active standby time of the memory page accessed by the memory access command in the second time window. The first duration is greater than the second duration. For example, the first value may be set based on the quantity of memory access commands (namely, the N first memory access commands) counted in the first time window. For example, it is ensured that a ratio of the first value to the quantity N of first memory access commands is greater than or equal to a value (namely, a preset ratio value like 50%, 60%, or 65%).

Figure 8:
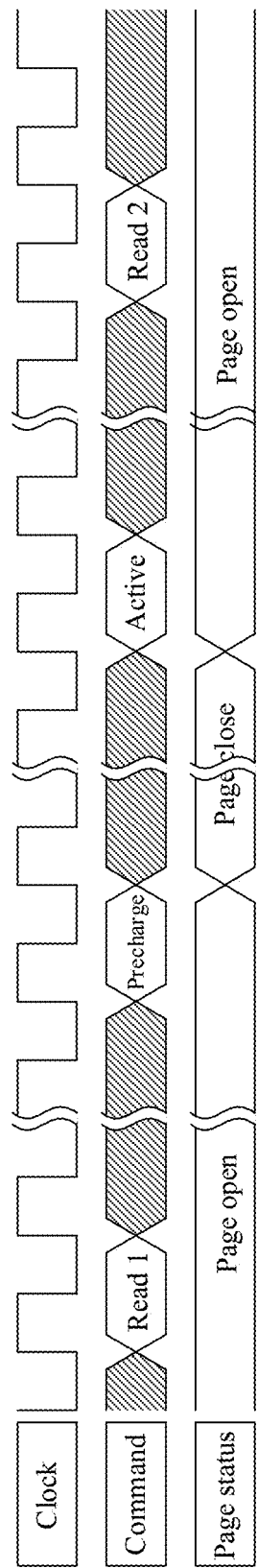
FIG. 8 is a diagram of a timing status of a rowhit command of a page that is closed by mistake according to an embodiment of this application.

Further, optionally, when collecting statistics on the quantity of rowhit commands, the memory controller 12 may also count, into the quantity of rowhit commands, a memory access command that hits a row that is incorrectly closed. For example, when a row to be accessed by a memory access command is consistent with a row accessed by a previous memory access command, but the row is closed, the current memory access command needs to reopen the row accessed by the previous memory access command for accessing, and it may be considered that the row is closed by mistake. In this case, the memory access command may also be counted as the rowhit command. This improves statistic accuracy. As shown in FIG. 8, when two memory access commands (for example, read 1 and read 2) read a same page, and the accessed page is closed after read 1 is completed for a period of time, the page needs to be reopened when accessed by read 2. In this case, if the page is not closed after read 1 is completed, read 2 may be directly hit a row (i.e., rowhit) opened by read 1 during access. Therefore, it is considered that read 2 is also a rowhit command in proper page active standby time.

In a possible implementation, if the average time interval is less than the first interval value, it may be considered that the stream of commands in the first time window corresponds to the command dense scenario. If the average time interval is greater than the second interval value, it may be considered that the stream of commands in the first time window corresponds to the command sparse scenario. For the command dense scenario and the command sparse scenario, short page active standby time (namely, a third duration) may be set for the memory page accessed by the memory access command in the second time window.

For how to determine the average time interval of the plurality of received memory access commands, refer to the following several example manners.

In a possible implementation, when collecting statistics on the N first memory access commands received in the first time window, the memory controller 12 may use a ratio of a width of the first time window to the quantity N of first memory access commands as the average time interval.

In a possible implementation, when collecting statistics on the N first memory access commands received in the first time window, the memory controller 12 may collect statistics on a time interval between each of (N−1) pairs of adjacent commands, to obtain a time interval between a $1^{st}$ pair of commands, a time interval between a $2^{nd}$ pair of commands, . . . , and a time interval between an (N−1)th pair of commands, and sum up time intervals of the (N−1) pairs of commands, to obtain an accumulated value of the time intervals. Finally, the memory controller 12 may determine a ratio of the accumulated value of the time intervals to the quantity N of first memory access commands as the average time interval. If a start point of the $1^{st}$ pair of commands is a start point of the first time window, and an end point of the (N−1)th pair of commands is an end point of the first time window, the accumulated value of the time intervals is equal to a length of the first time window.

In a possible implementation, when collecting statistics on the N first memory access commands received in the first time window, the memory controller 12 may collect statistics on only a time interval at which a $1^{st}$ command and a last command in the N first memory access commands are received. Then, the memory controller 12 may determine a ratio of the time interval at which the $1^{st}$ command and the last command are received to the quantity N of first memory access commands as the average time interval. In comparison with the manner of collecting statistics on the time interval between each pair of adjacent commands, when the quantity of memory access commands is large, the manner of collecting statistics on only the time interval between the $1^{st}$ command and the last command can significantly reduce statistic workload. It may be understood that if the $1^{st}$ command is received at the start point of the first time window, and the last command is received at the end point of the first time window, the time interval between the $1^{st}$ command and the last command is equal to the length of the first time window.

It should be noted that, in addition to the average time interval (namely, the mean value), the memory controller 12 may also adjust the page active standby time based on a median (or command density information) of time intervals of a plurality of pairs of adjacent commands. For a manner of determining a corresponding scenario based on the median, refer to related descriptions of determining a scenario corresponding to the average time interval. It should be noted that, in a case in which only one memory access command is received in a time window, a length of the entire time window may be determined as a median of a time interval of the command. It should be further noted that when the memory controller 12 also adjusts the page active standby time based on the command density information, logic used by the memory controller 12 to determine a scenario corresponding to a memory access behavior is slightly different. When a time interval is large, a corresponding scenario is a command sparse scenario. When a time interval is small, a corresponding scenario is a command dense scenario. When a command density is large, a corresponding scenario is a command dense scenario. When a command density is small, a corresponding scenario is a command sparse scenario. It is clear that the memory controller 12 may also adjust the page active standby time by comprehensively considering information such as the average time interval, the median of the time intervals, and the command density information. Details are not described herein.

In addition, during actual application, a memory chip (or an integrated circuit (IC)) of the DRAM usually includes a plurality of banks. Although the banks share one memory input/output (I/O) controller, reading and writing inside each bank may be performed in parallel. Therefore, when collecting statistics on the memory access command, the reception interval information (for example, the average time interval), and the quantity of rowhit commands, the memory controller 12 may separately collect statistics on different banks, and may separately adjust page active standby time in different banks. For example, the N first memory access commands received in the first time window and the second memory access command in the second time window access a same bank. Therefore, the memory controller 12 may adjust a page status management policy of the bank. It should be further noted that, when a memory access command arrives at the memory controller 12, a memory address is carried, and may correspond to a bank, a row in the bank, and a column in the row. Therefore, the memory controller 12 may distinguish memory access commands accessing different banks, and may separately collect statistics on the memory access commands accessing different banks, to finally separately control page status management policies of different banks.

For ease of understanding, an idea of the page status management method provided in embodiments of this application is briefly described by using a product that uses a low-power double data rate (LPDDR) synchronous DRAM (SDRAM) 5 with a rate of 8533 megabits per second (Mbps) as an example. For the LPDDR5 product with a rate of 8533 Mbps, based on measured power consumption data of the DRAM, energy that an active command (used to activate a closed row) needs is about 452.74 nanojoules (nJ), energy that a page close command (namely, a precharge command, used to close an opened row) needs is about 325.89 nJ, energy consumed in each clock cycle when a page is in an active state and waits to be closed (namely, page active standby) is about 18.65 nJ, and energy consumed in each clock cycle when the page is in a close state and waits to be opened is about 12.42 nJ. If power consumption between the active page, the closed page, the page active standby state, and the page idle standby state can be balanced, and page active standby time of a memory page is controlled in a timely and proper manner, power consumption of the DRAM can be reduced.

To achieve balance between the foregoing types of power consumption, in embodiments of this application, a page close policy of a subsequent time window is properly and dynamically adjusted based on the feature of the stream of commands of the memory access behavior in the current time window, so that power consumption caused by memory access behaviors in different scenarios is lower. For example, if it is identified that the feature of the stream of commands of the memory access behavior corresponds to a command dense scenario, the page active standby time may be adjusted to a short level, and a page automatic close state in which the page active standby time is set to 0 may even be set, to reduce standby time of sending a page close command and power consumption of the standby time. If it is identified that the feature of the stream of commands of the memory access behavior corresponds to a command sparse scenario, the page active standby time may also be adjusted to a short level because energy consumed in time in which the page in an active state waits to be closed is greater than energy consumed by the active command and the page close command in this scenario. If it is identified that the feature of the stream of commands of the memory access behavior corresponds to a medium-sized command interval scenario, the quantity of rowhit commands may be further determined, and the page active standby time is controlled based on the quantity of rowhit commands.

Figure 9:
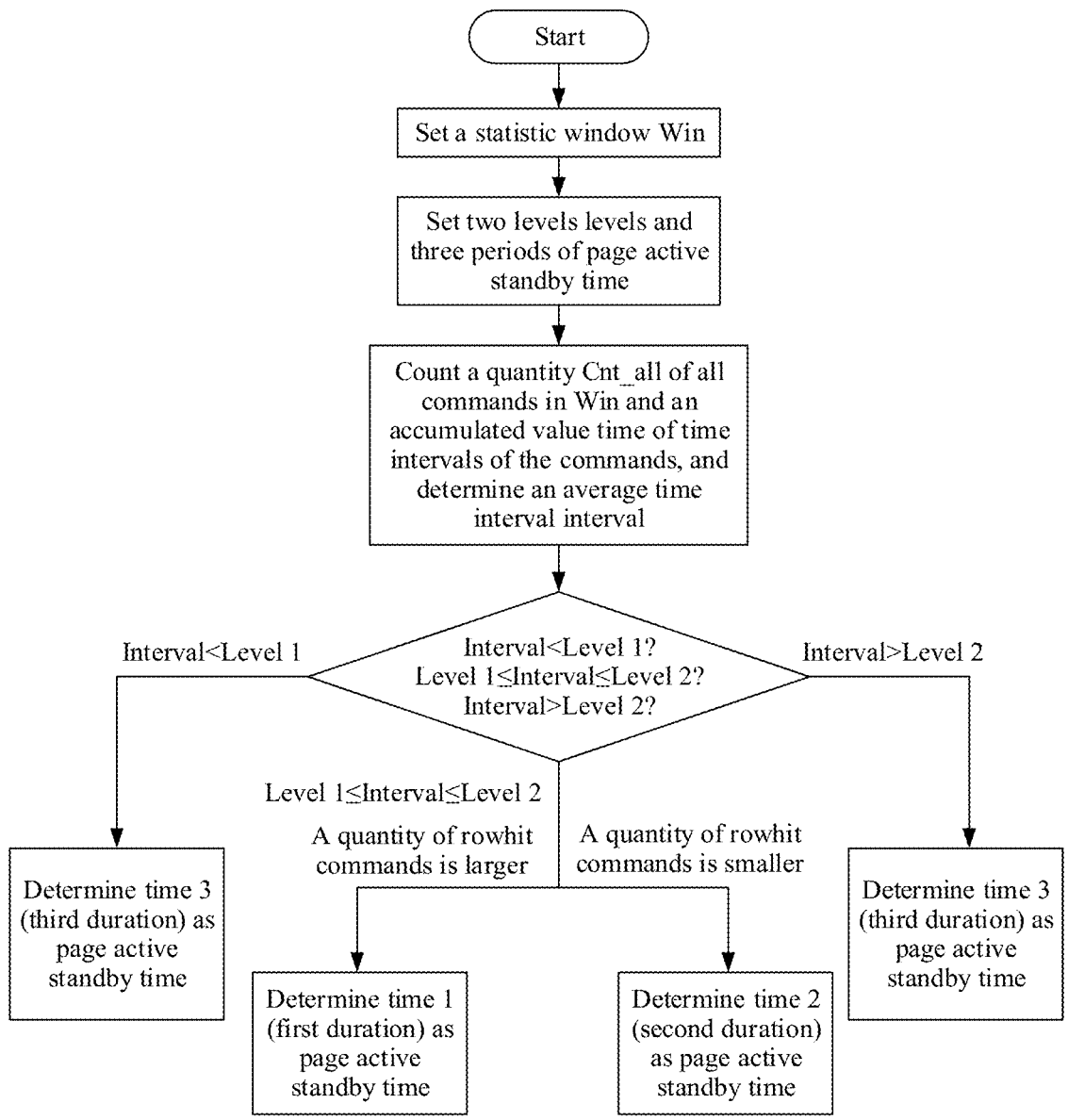
FIG. 9 is a diagram of a determining procedure of a page status management method according to an embodiment of this application.

For a determining procedure of the page status management method, refer to FIG. 9. FIG. 9 is a diagram of a determining procedure of a page status management method according to an embodiment of this application. For example, a statistic window Win (corresponding to the first time window), several levels (for example, two levels: a level 1 and a level 2, respectively corresponding to the first interval value and the second interval value), and several durations (for example, three durations: time 1, time 2, and time 3, respectively corresponding to the first duration, the second duration, and the third duration) are set.

The DMC counts a quantity (which is denoted as Cnt_all) of all commands received in Win and an accumulated value time of time intervals of adjacent commands in the commands. Time/Cnt_all is an average time interval of all commands received by the DMC in Win. A result of the average time interval may include the following cases:

(1) Case 1: When a value of the interval is less than the level 1, that is, the average time interval is less than the first interval value, it indicates that command pressure is high, an interval between the memory access commands is small, and the commands densely arrive at the DMC. In this case, the DMC may adjust the page active standby time to a small value (for example, the third duration, namely, the time 3), so that the page can be quickly closed, or even set the page active standby time to 0. If rowmiss commands are continuously sent, a row opened by a previous memory access command needs to be closed as soon as possible. If commands including a rowhit command are continuously sent, it is considered that there is a timing requirement (namely, the write recovery time) for the read/write command and the precharge command. The rowhit command usually arrives within the write recovery time, and may directly perform accessing. In other words, this case does not affect performance of a subsequent rowhit command. It should be noted that, if the page active standby time is set to 0, the memory controller usually sends the read/write command and the precharge command together. When the read/write operation ends and the timing requirement of the precharge command is met subsequently, the accessed page is directly closed. If a rowhit command arrives during this period, the command cannot directly access the page.

(2) Case 2: When a value of the interval is greater than the level 2, that is, the average time interval is greater than the second interval value, it indicates that command pressure is low, an interval between the memory access commands is large, and the commands sparsely arrive at the DMC. In this case, the DMC may adjust the page active standby time to a small value (for example, the third duration, namely, the time 3), so that the page can be quickly closed, or even set the page active standby time to 0. If rowmiss commands are continuously sent, a row opened by a previous memory access command needs to be closed as soon as possible. If commands including a rowhit command are continuously sent, it is considered that a time interval between the commands is too large. Consequently, power consumption of a page in an active standby state until a next rowhit command arrives is greater than power consumption of the precharge command and the active command.

(3) Case 3: When a value of the interval is between the level 1 and the level 2, that is, the average time interval is greater than or equal to the first interval value and less than or equal to the second interval value, it indicates that command pressure is medium, and the interval corresponds to a medium-sized command interval scenario. A quantity (which is denoted as Cnt_rhit) of rowhit commands in all commands received in Win needs to be further determined. When Cnt_rhit is large, the DMC may adjust the page active standby time to a large value (for example, the first duration, namely, the time 1), so that the page can be closed later. This facilitates subsequent access of the rowhit command.

(4) Case 4: A value of the interval is between the level 1 and the level 2, that is, the average time interval is greater than or equal to the first interval value and less than or equal to the second interval value. When Cnt_rhit is small, it indicates that addresses of a plurality of memory access commands are random. The DMC may adjust the page active standby time to a small value (for example, the second duration, namely, the time 2), so that the page can be closed early, or even set the page active standby time to 0.

A value of the level 1 may be a value equal to write recovery time of the LPDDR5 product with a rate of 8533 Mbps, and a value of the level 2 may be determined based on power consumption of an active command, power consumption of a page close command, active-standby power consumption, idle-standby power consumption of the product, and other actual parameters.

It should be noted that, for the foregoing cases in which the quantity of rowhit commands needs to be further determined (for example, the case 3 and the case 4), the DMC may collect statistics on both the quantity of all received commands (Cnt_all) and Cnt_rhit, or may collect statistics on the quantity of rowhit commands (Cnt_rhit) after determining that the value of the average time interval is between the level 1 and the level 2. This is not limited herein. It should be further noted that an example of setting two levels and one Cnt_rhit level is merely used in the foregoing embodiments, which can be extensible. If the page active standby time needs to be controlled more precisely, more levels and Cnt_rhit levels may be set, and corresponding page active standby time (for example, the first duration, the second duration, the third duration, . . . , and an $N^{th}$ duration) may be set for the levels and Cnt_rhit levels.

It should be further noted that an example in which the second time window is a time window following the first time window is used in the foregoing embodiments. Optionally, the second time window may alternatively be a time window after several time windows following the first time window. For example, there may be a third time window between the second time window and the first time window, that is, the second time window may be a $2^{nd}$ time window after the first time window. When determining the active standby time of the memory page accessed by the memory access command in the second time window, the memory controller may separately collect statistics on commands in the first time window and the third time window, and determine page active standby time in the second time window based on a specific weight value. For example, T2=0.3T1+0.7T3, where T2 is the page active standby time in the second time window, T1 is page active standby time recommended based on a statistic result of the commands in the first time window, and T3 is page active standby time recommended based on a statistic result of the commands in the third time window.

The foregoing content describes in detail the method provided in this application. To facilitate implementation of the foregoing solutions in embodiments of this application, embodiments of this application further provide corresponding apparatuses or devices.

In this application, the apparatus is divided into functional modules according to the foregoing method embodiments. For example, functional modules corresponding to functions may be obtained through division, or two or more functions may be integrated into one processing module. The integrated module may be implemented in a form of hardware, or may be implemented in a form of a software functional module. It should be noted that, in this application, module division is an example, and is merely a logical function division. In actual implementation, another division manner may be used. The following describes apparatuses in embodiments of this application with reference to the accompanying drawings.

Figure 10:
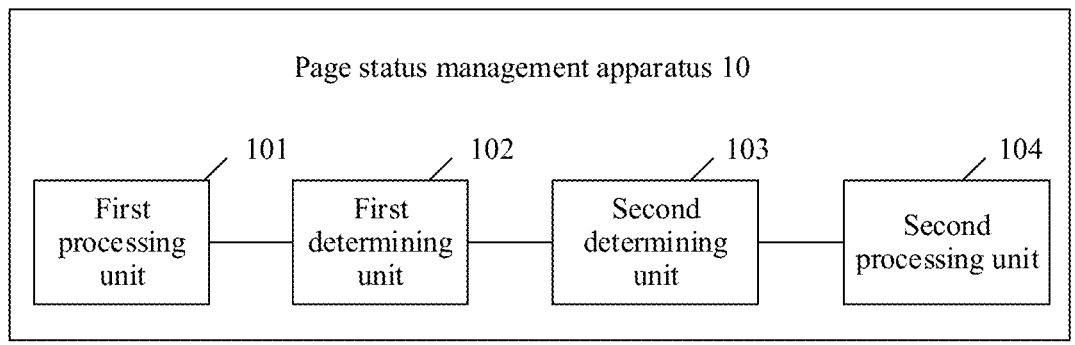
FIG. 10 is a diagram of a structure of a page status management apparatus according to an embodiment of this application.

FIG. 10 is a diagram of a structure of a page status management apparatus according to an embodiment of this application. The apparatus 10 may be configured to implement the method functions in FIG. 6, and therefore can also implement beneficial effect of the foregoing method embodiments.

As shown in FIG. 10, the apparatus 10 may include a first processing unit 101, a first determining unit 102, a second determining unit 103, and a second processing unit 104. Detailed descriptions of the units are as follows:

The first processing unit 101 is configured to collect statistics on N first memory access commands received in a first time window.

The first determining unit 102 is configured to determine reception interval information of the N first memory access commands, where the reception interval information indicates denseness of a stream of commands in the first time window.

The second determining unit 103 is configured to determine active standby time based on the reception interval information.

The second processing unit 104 is configured to, after a second memory access command accesses a target memory page, if no other memory access command accesses the target memory page within the active standby time, close the target memory page, where the second memory access command is any memory access command received in a second time window, and the second time window is a time window after the first time window.

In a possible implementation, the reception interval information includes one or more of the following: time interval information for receiving the N first memory access commands or command density information of the N first memory access commands.

In a possible implementation, the reception interval information includes the time interval information for receiving the N first memory access commands, and the second determining unit 103 is further configured to, when the time interval information is greater than or equal to a first interval value and less than or equal to a second interval value, determine a quantity of target commands in the N first memory access commands, where the target command is a rowhit command, and the second interval value is greater than the first interval value, and determine the active standby time based on the quantity of target commands.

In a possible implementation, the second determining unit 103 is further configured to, if the quantity of target commands is greater than or equal to a first value, determine a first duration as the active standby time, or if the quantity of target commands is less than the first value, determine a second duration as the active standby time, where the second duration is less than the first duration.

In a possible implementation, the reception interval information includes the time interval information for receiving the N first memory access commands, and the second determining unit 103 is further configured to, when the time interval information is less than the first interval value or greater than the second interval value, determine a third duration as the active standby time, where the second interval value is greater than the first interval value.

In a possible implementation, a ratio of the first value to the quantity N of first memory access commands is greater than or equal to a preset ratio value.

In a possible implementation, the reception interval information includes the time interval information for receiving the N first memory access commands, the time interval information includes an average time interval at which the N first memory access commands are received, and the first determining unit 102 is further configured to determine a ratio of a width of the first time window to the quantity N of first memory access commands as the average time interval.

In a possible implementation, the reception interval information includes the time interval information for receiving the N first memory access commands, the time interval information includes an average time interval at which the N first memory access commands are received, and the first determining unit 102 is further configured to determine a time interval at which each pair of N−1 pairs of adjacent commands in the N first memory access commands is received, and determine a ratio of an accumulated value of the time intervals at which the N−1 pairs of adjacent commands are received to the quantity N of first memory access commands as the average time interval.

In a possible implementation, the reception interval information includes the time interval information for receiving the N first memory access commands, the time interval information includes an average time interval at which the N first memory access commands are received, and the first determining unit 102 is further configured to determine a time interval at which a $1^{st}$ command and a last command in the N first memory access commands are received, and determine a ratio of the time interval at which the $1^{st}$ command and the last command are received to the quantity N of first memory access commands as the average time interval.

In a possible implementation, the reception interval information includes the time interval information for receiving the N first memory access commands, the time interval information includes a median of time intervals at which N−1 pairs of adjacent commands in the N first memory access commands are received, and the first determining unit 102 is further configured to determine a time interval at which each pair of the N−1 pairs of adjacent commands in the N first memory access commands is received, and determine the median from the time intervals of the N−1 pairs of adjacent commands.

In a possible implementation, each of the N first memory access commands and the second memory access command are used to access a same bank.

It should be noted that, for functions of functional units/modules of the page status management apparatus 10 described in embodiments of this application, refer to related descriptions in the foregoing method embodiments. Details are not described herein again.

The foregoing describes the page status management apparatus in embodiments of this application, and the following describes a possible product form of the page status management apparatus. It should be understood that any form of product that has a function of the page status management apparatus described in FIG. 10 falls within the protection scope of embodiments of this application. It should be further understood that the following descriptions are merely examples, and do not limit a product form of the page status management apparatus in embodiments of this application.

Figure 11:
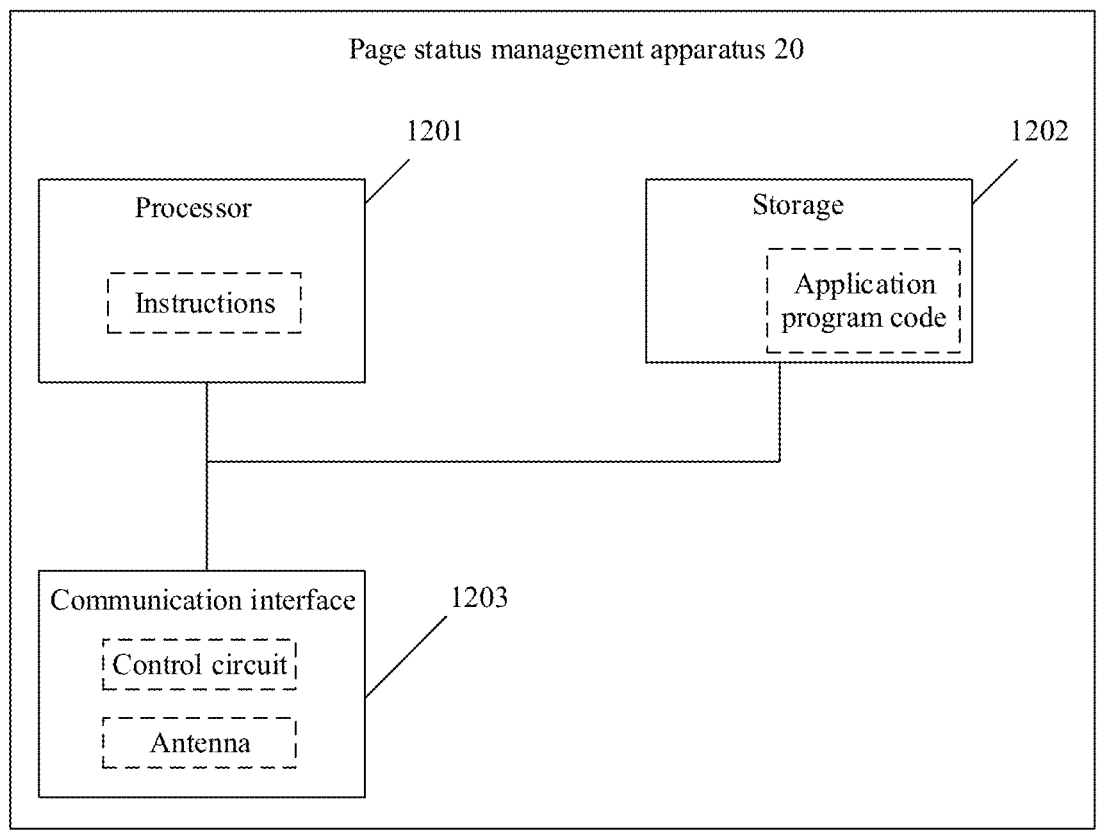
FIG. 11 is a diagram of a structure of another page status management apparatus according to an embodiment of this application.

As shown in FIG. 11, FIG. 11 is a diagram of a structure of another page status management apparatus according to an embodiment of this application. The apparatus 20 includes at least one processor 1201, at least one storage 1202, and at least one communication interface 1203. In addition, the device may further include a general-purpose component such as an antenna, and details are not described herein.

The processor 1201 may be a general-purpose CPU, a microprocessor, an application-specific integrated circuit (ASIC), or one or more integrated circuits for controlling execution of the foregoing solution program.

The communication interface 1203 is configured to communicate with another device or a communication network, for example, the Ethernet, a radio access network (RAN), a core network, or a wireless local area network (WLAN).

The storage 1202 may be a ROM or another type of static storage device that can store static information and instructions, or a RAM or another type of dynamic storage device that can store information and instructions, or may be an EEPROM, a CD-ROM or another compact disc (CD) storage, an optical disc storage (including a compact disc, a laser disc, an optical disc, a DIGITAL VERSATILE DISC (DVD), a BLU-RAY disc, or the like), a magnetic disk storage medium or another magnetic storage device, or any other medium that can be used to carry or store expected program code in a form of an instruction or a data structure and that can be accessed by a computer. However, the storage 1202 is not limited thereto. The storage may exist independently, and is connected to the processor through the bus. The storage may alternatively be integrated with the processor.

The storage 1202 is configured to store application program code used to perform the page status management method, and the processor 1201 controls the execution. The processor 1201 is configured to execute the application program code stored in the storage 1202.

The code stored in the storage 1202 may be used to perform the page status management method provided in FIG. 6, for example, collecting statistics on N first memory access commands received in a first time window, determining reception interval information of the N first memory access commands, where the reception interval information indicates denseness of a stream of commands in the first time window, determining active standby time based on the reception interval information, and after a second memory access command accesses a target memory page, if no other memory access command accesses the target memory page within the active standby time, closing the target memory page, where the second memory access command is any memory access command received in a second time window, and the second time window is a time window after the first time window.

It should be noted that, for functions of functional units of the page status management apparatus 20 described in embodiments of this application, refer to related descriptions in the method embodiments described in FIG. 6. Details are not described herein again.

It should be noted that the page status management apparatus described in this application is not limited thereto. The page status management apparatus may be located in any terminal device, for example, various devices such as a computer, a computer device, a mobile phone, a tablet, or a server. The page status management apparatus may be a chip, a chipset, or a circuit board on which a chip or a chipset is mounted. The chip, the chipset, or the circuit board on which the chip or the chipset is mounted may work when driven by necessary software. For example, the page status management apparatus may be:

(1) an independent integrated circuit IC, a chip, a chip system, or a subsystem;
(2) a set including one or more ICs, where optionally, the set of ICs may further include a storage component configured to store data and a computer program;
(3) a module that can be embedded in another device; and
(4) another device or the like.

In an implementation, the page status management apparatus 20 may include a circuit, and the circuit may implement a sending, receiving, or communication function in the foregoing method embodiments. The processor and the transceiver described in this application may be implemented on an IC, an analog IC, a radio frequency IC (RFIC), a mixed-signal IC, an ASIC, a printed circuit board (PCB), an electronic device, or the like. The processor and the transceiver may alternatively be manufactured by using various IC technologies, for example, a complementary metal-oxide-semiconductor (CMOS), an N-type metal-oxide-semiconductor (NMOS), a P-type metal-oxide-semiconductor (PMOS), a bipolar junction transistor (BJT), a bipolar CMOS (BiCMOS), silicon germanium (SiGe), and gallium arsenide (GaAs).

Figure 12:
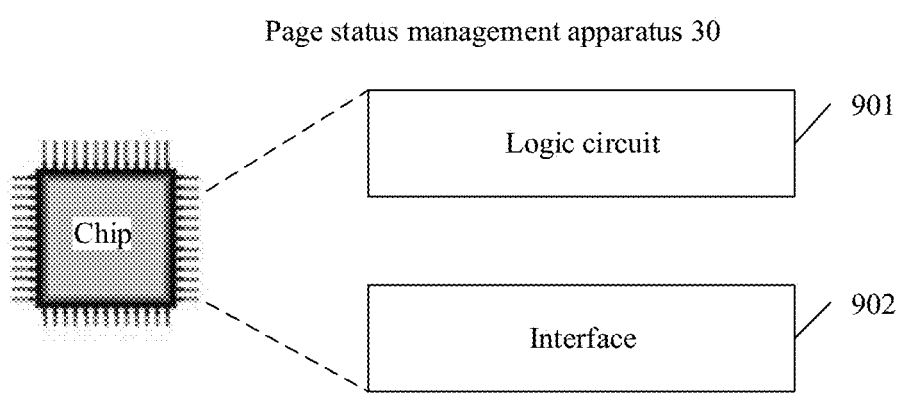
FIG. 12 is a diagram of a structure of still another page status management apparatus according to an embodiment of this application.

In another possible implementation, in the apparatus shown in FIG. 10, the first processing unit 101, the first determining unit 102, the second determining unit 103, and the second processing unit 104 may be one or more logic circuits. The units may interact with each other through an input/output interface, which is also referred to as a communication interface, an interface circuit, an interface, or the like. FIG. 12 is a diagram of a structure of still another page status management apparatus according to an embodiment of this application. As shown in FIG. 12, the page status management apparatus 30 includes a logic circuit 901 and an interface 902. In other words, the first processing unit 101, the first determining unit 102, the second determining unit 103, and the second processing unit 104 may be implemented by using the logic circuit 901, and interaction between the units may be implemented through the interface 902. The logic circuit 901 may be a chip, a processing circuit, an integrated circuit, an SoC, or the like. The interface 902 may be a communication interface, an input/output interface, a pin, or the like. For example, FIG. 12 shows an example in which the page status management apparatus 30 is a chip. The chip includes the logic circuit 901 and the interface 902. In embodiments of this application, the logic circuit may be further coupled to the interface. A specific manner of connection between the logical circuit and the interface is not limited in embodiments of this application.

It may be understood that for specific descriptions of the logic circuit 901 and the interface 902, refer to descriptions of the processing unit and the determining unit in the apparatus embodiments shown in FIG. 10. Details are not described herein again.

It may be understood that the apparatus shown in embodiments of this application may implement the method provided in embodiments of this application in a form of hardware or in a form of software. This is not limited in embodiments of this application.

For specific implementations of embodiments shown in FIG. 12, refer to the foregoing embodiments. Details are not described herein again.

An embodiment of this application further provides a computer-readable storage medium. The computer-readable storage medium stores computer program code. When the processor executes the computer program code, a computer is enabled to perform the method in any one of the foregoing embodiments.

An embodiment of this application further provides an electronic device. The electronic device may exist in a product form of a chip, the electronic device includes a processor, and the processor is configured to support the electronic device in implementing a corresponding function in the method in any one of the foregoing embodiments. The electronic device may further include a storage. The storage is configured to be coupled to the processor, and the storage stores program instructions and data that are necessary for the electronic device. The electronic device may further include a communication interface, used for communication between the electronic device and another device or a communication network.

An embodiment of this application further provides a computer program product. When the computer program product runs on a computer, the computer is enabled to perform the method in any one of the foregoing embodiments.

An embodiment of this application provides a chip system. The chip system includes a processor configured to support a device in implementing corresponding functions in the method in any one of the foregoing embodiments, for example, generating or processing information, an instruction, or a command in the page status management method. In a possible design, the chip system further includes a storage, and the storage is configured to store program instructions and data that are necessary for the device. The chip system may include a chip, or may include a chip and another discrete component.

In the foregoing embodiments, descriptions of embodiments have respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should further be appreciated by a person skilled in the art that embodiments described in this specification all belong to example, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments in this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, a network device, or the like, and may be a processor in the computer device) to perform all or some of the steps of the methods described in embodiments of this application. The foregoing storage medium may include: any medium that can store program code, for example, a Universal Serial Bus (USB) flash drive, a removable hard disk, a magnetic disk, an optical disc, a ROM, or a RAM.

It should be noted that the connection relationship related in embodiments, for example, serial connection or parallel connection, is electrical connection. The connection may be direct connection by using a wire, or may be coupling in another manner based on electric effect.

In the foregoing embodiments, descriptions of embodiments have respective focuses. For a part that is not described in detail in an embodiment, refer to related descriptions in other embodiments. The foregoing embodiments are merely intended for describing the technical solutions of the present disclosure, but not for limiting the present disclosure. Although the present disclosure is described in detail with reference to the foregoing embodiments, a person of ordinary skill in the art should understand that modifications may still be made to the technical solutions described in the foregoing embodiments or equivalent replacements may be made to some technical features thereof, without departing from the spirit and scope of the technical solutions in embodiments of the present disclosure.

The invention claimed is:

1. A page status management method comprising:
receiving N first memory access commands in a first time window;
collecting statistics on the N first memory access commands;

determining reception interval information of the N first memory access commands based on the statistics, wherein the reception interval information indicates denseness of a stream of commands in the first time window;

determining an active standby time based on the reception interval information; and receiving a second memory access command in a second time window, wherein the second time window is after the first time window; and closing a target memory page after accessing the target memory page using the second memory access command and when no other memory access command is used to access the target memory page within the active standby time.

2. The page status management method of claim 1, wherein the reception interval information comprises one or more of time interval information for receiving the N first memory access commands or command density information of the N first memory access commands.

3. The page status management method of claim 1, wherein the reception interval information comprises time interval information for receiving the N first memory access commands, and wherein determining the active standby time comprises:

determining a quantity of target commands in the N first memory access commands when the time interval information is greater than or equal to a first interval value and less than or equal to a second interval value, wherein each of the target commands is a rowhit command, and wherein the second interval value is greater than the first interval value; and determining the active standby time based on the quantity of target commands.

4. The page status management method of claim 3, wherein determining the active standby time based on the quantity of target commands comprises:

determining a first duration as the active standby time when the quantity of target commands is greater than or equal to a first value; and determining a second duration as the active standby time when the quantity of target commands is less than the first value, wherein the second duration is less than the first duration.

5. The page status management method of claim 4, wherein a ratio of the first value of the N first memory access commands is greater than or equal to a preset ratio value.

6. The page status management method of claim 1, wherein the reception interval information comprises time interval information for receiving the N first memory access commands, and wherein determining the active standby time comprises:

identifying that the time interval information is less than a first interval value or greater than a second interval value, wherein the second interval value is greater than the first interval value; and determining, in response to identifying that the time interval information is less than the first interval value or greater than the second interval value, a duration as the active standby time.

7. The page status management method of claim 1, wherein the reception interval information comprises time interval information for receiving the N first memory access commands, wherein the time interval information comprises an average time interval at which the N first memory access commands are received, and wherein determining the reception interval information comprises determining a ratio of a width of the first time window to a quantity of the N first memory access commands as the average time interval.

8. The page status management method of claim 1, wherein the reception interval information comprises time interval information for receiving the N first memory access commands, wherein the time interval information comprises an average time interval at which the N first memory access commands are received, and wherein determining the reception interval information comprises:

determining a time interval at which each pair of N−1 pairs of adjacent commands in the N first memory access commands is received; and determining a ratio of an accumulated value of time intervals at which the N−1 pairs of adjacent commands are received to a quantity of the N first memory access commands as the average time interval.

9. The page status management method of claim 1, wherein the reception interval information comprises time interval information for receiving the N first memory access commands, wherein the time interval information comprises an average time interval at which the N first memory access commands are received, and wherein determining the reception interval information comprises:

determining a time interval at which a $1^{st}$ command in the N first memory access commands and a last command in the N first memory access commands are received; and determining a ratio of the time interval to a quantity of the N first memory access commands as the average time interval.

10. The page status management method of claim 1, wherein the reception interval information comprises time interval information for receiving the N first memory access commands, wherein the time interval information comprises a median of time intervals at which N−1 pairs of adjacent commands in the N first memory access commands are received, and wherein determining the reception interval information comprises:

determining a time interval at which each pair of the N−1 pairs of adjacent commands in the N first memory access commands is received; and determining the median from the time intervals.

11. The page status management method of claim 1, wherein each of the N first memory access commands and the second memory access command are used to access a same bank.

12. An electronic device comprising:

a storage configured to store instructions; and one or more processors coupled to the storage and configured to execute the instructions to cause the electronic device to:

receive N first memory access commands in a first time window;

collect statistics on the N first memory access commands;

determine reception interval information of the N first memory access commands based on the statistics, wherein the reception interval information indicates denseness of a stream of commands in the first time window;

determine an active standby time based on the reception interval information;

receive a second memory access command in a second time window, wherein the second time window is after the first time window; and close a target memory page after accessing the target memory page using a second memory access command and when no other memory access command is used to access the target memory page within the active standby time.

13. The electronic device of claim 12, wherein the reception interval information comprises one or more of time interval information for receiving the N first memory access commands or command density information of the N first memory access commands.

14. The electronic device of claim 12, wherein the reception interval information comprises time interval information for receiving the N first memory access commands, and wherein the one or more processors are further configured to execute the instructions to cause the electronic device to:
    determine a quantity of target commands in the N first memory access commands when the time interval information is greater than or equal to a first interval value and less than or equal to a second interval value, wherein each of the target commands is a rowhit command, and wherein the second interval value is greater than the first interval value; and
    determine the active standby time based on the quantity of target commands.

15. The electronic device of claim 14, wherein the one or more processors are further configured to execute the instructions to cause the electronic device to:
    determine a first duration as the active standby time when the quantity of target commands is greater than or equal to a first value; and
    determine a second duration as the active standby time when the quantity of target commands is less than the first value, wherein the second duration is less than the first duration.

16. The electronic device of claim 15, wherein a ratio of the first value of the N first memory access commands is greater than or equal to a preset ratio value.

17. The electronic device of claim 12, wherein the reception interval information comprises time interval information for receiving the N first memory access commands, and wherein the one or more processors are further configured to execute the instructions to cause the electronic device to:
    identify that the time interval information is less than a first interval value or greater than a second interval value; and
    determine, in response to identifying that the time interval information is less than the first interval value or greater than the second interval value, a duration as the active standby time, wherein the second interval value is greater than the first interval value.

18. The electronic device of claim 12, wherein the reception interval information comprises time interval information for receiving the N first memory access commands, wherein the time interval information comprises an average time interval at which the N first memory access commands are received, and wherein the one or more processors are further configured to execute the instructions to cause the electronic device to determine a ratio of a width of the first time window to a quantity of the N first memory access commands as the average time interval.

19. The electronic device of claim 12, wherein the reception interval information comprises time interval information for receiving the N first memory access commands, wherein the time interval information comprises an average time interval at which the N first memory access commands are received, and wherein the one or more processors are further configured to execute the instructions to cause the electronic device to:
    determine a time interval at which each pair of N−1 pairs of adjacent commands in the N first memory access commands is received; and
    determine a ratio of an accumulated value of time intervals at which the N−1 pairs of adjacent commands are received to a quantity of the N first memory access commands as the average time interval.

20. A chip system comprising:
    one or more processors configured to execute the instructions to cause the chip system to:
        receiving N first memory access commands in a first time window;
        determine reception interval information of the N first memory access commands, wherein the reception interval information indicates denseness of a stream of commands in the first time window;
        determine an active standby time based on the reception interval information;
        receive a second memory access command in a second time window, wherein the second time window is after the first time window; and
        close a target memory page after accessing the target memory page using the second memory access command and when no other memory access command is used to access the target memory page within the active standby time.

* * * * *